United States Patent
Cui et al.

(10) Patent No.: US 12,445,982 B2
(45) Date of Patent: Oct. 14, 2025

(54) METHODS AND APPARATUS FOR SCHEDULING AVAILABILITY/RESTRICTION AND MEASUREMENT SHARING FOR SSB BASED INTER-FREQUENCY MEASUREMENT WITHOUT MEASUREMENT GAP

(71) Applicant: APPLE INC., Cupertino, CA (US)

(72) Inventors: Jie Cui, Cupertino, CA (US); Hong He, Cupertino, CA (US); Dawei Zhang, Cupertino, CA (US); Chunhai Yao, Beijing (CN); Chunxuan Ye, San Diego, CA (US); Haitong Sun, Cupertino, CA (US); Weidong Yang, San Diego, CA (US); Wei Zeng, Cupertino, CA (US); Yuchul Kim, Cupertino, CA (US); Yushu Zhang, Beijing (CN); Zhibin Wu, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 390 days.

(21) Appl. No.: 17/758,410

(22) PCT Filed: Dec. 15, 2020

(86) PCT No.: PCT/CN2020/136516
§ 371 (c)(1),
(2) Date: Jul. 6, 2022

(87) PCT Pub. No.: WO2021/159847
PCT Pub. Date: Aug. 19, 2021

(65) Prior Publication Data
US 2023/0030177 A1    Feb. 2, 2023

(30) Foreign Application Priority Data
Feb. 12, 2020    (WO) ............... PCT/CN2020/074850

(51) Int. Cl.
*H04W 56/00* (2009.01)
*H04L 5/14* (2006.01)
*H04W 24/10* (2009.01)

(52) U.S. Cl.
CPC ............ *H04W 56/001* (2013.01); *H04L 5/14* (2013.01); *H04W 24/10* (2013.01)

(58) Field of Classification Search
CPC ...... H04W 56/001; H04W 24/10; H04L 5/14; H04L 5/0048; H04L 5/0064;
(Continued)

(56) References Cited

U.S. PATENT DOCUMENTS

| | | |
|---|---|---|
| 2019/0182900 A1 | 6/2019 | Cui et al. |
| 2019/0239106 A1 | 8/2019 | Cui et al. |

(Continued)

FOREIGN PATENT DOCUMENTS

| | | |
|---|---|---|
| CN | 110114998 A | 8/2019 |
| CN | 110115058 A | 8/2019 |

(Continued)

OTHER PUBLICATIONS

3GPP TS 38.133, "3rd Generation Partnership Project; Technical Specification Group Radio Access Network; NR; Requirements for support of radio resource management (Release 16)", V16.2.0, Dec. 2019, 16 pages.

(Continued)

*Primary Examiner* — Shawn D Miller
(74) *Attorney, Agent, or Firm* — Dorsey & Whitney LLP

(57) ABSTRACT

Methods, systems, and devices for wireless communications are described. SSB based inter-frequency measurements may include configuring a UE to perform inter-frequency measurements without measurement gap within a measurement window, and applying scheduling restrictions to prioritize the inter-frequency measurements over uplink trans- (Continued)

missions within the measurement window. The measurement window includes an SMTC window duration. Measurement resource sharing or restriction is described for SSB based inter-frequency measurement objects without measurement gap.

11 Claims, 5 Drawing Sheets

(58) Field of Classification Search
CPC ............... H04L 5/0082; H04L 5/1469; H04L 27/26025; H04L 27/261; H04L 5/001
See application file for complete search history.

(56) References Cited

U.S. PATENT DOCUMENTS

| | | | |
|---|---|---|---|
| 2019/0274146 A1 | 9/2019 | Tang et al. | |
| 2019/0306734 A1* | 10/2019 | Huang | H04W 24/08 |
| 2021/0083730 A1* | 3/2021 | Hwang | H04L 5/0092 |
| 2022/0279402 A1* | 9/2022 | Zheng | H04W 36/0083 |

FOREIGN PATENT DOCUMENTS

| | | |
|---|---|---|
| CN | 110583039 A | 12/2019 |
| WO | 2018086907 A1 | 5/2018 |
| WO | 2019096398 A1 | 5/2019 |

OTHER PUBLICATIONS

Intel Corporation, "ad-hoc for R16 NR RRM enhancement", R4-1915924, 3GPP TSG-RAN WG4 Meeting #93, Reno, Nevada, Agenda Item 9.15, Nov. 18-22, 2019, 33 pages.
Mediatek Inc., "Inter-frequency measurement requirement without gap", R4-1913587, 3GPP TSG-RAN WG4 Meeting #93 Reno, USA, Agenda Item 9.15.1.5, Nov. 18-22, 2019, 5 pages.
PCT/CN2020/136516, International Search Report and Written Opinion, 9 pages, Mar. 16, 2021.
CMCC, "Discussion on inter-frequency measurement without Mg", R4-1911077, 3GPP TSG-RAN WG4 Meeting #92-Bis, Chongqing, China, Agenda Item 8.15.1.5, 7 pages, Oct. 14-18, 2019.
Apple , "On scheduling restriction for inter-frequency measurement without gap", R4-1913502, 3GPP TSG-RAN4 Meeting #93, Reno, Nevada, Agenda Item 9.15.1.5, Nov. 18-22, 2019, 2 pages.
CMCC , "CR on introducing inter-frequency measurements without measurement gap (9.1.5, 9.1.6, 9.3.1, 9.3.4, 9.3.5)", R4-1913682, 3GPP TSG-RAN WG4 Meeting #93, Reno, Nevada, Change Request 38.133 CR 0138 Current Version 16.1.0, Nov. 18-22, 2019, 15 pages.
CMCC, "Discussion on inter-frequency measurement without gap", R4-1906071, 3GPP TSG-RAN WG4 Meeting #91, Reno. Nevada, Agenda Item 6.10.1, May 13-17, 2019, 5 pages.
OPPO , "Discussion on inter-frequency measurement requirement", R4-1915068, 3GPP TSG-RAN WG4 Meeting #93, Reno, Nevada, Agenda Item 8.15.1.5, Nov. 18-22, 2019, 4 pages.
CMCC, "Discussion on intra-frequency measureme", R4-1803859, 3GPP TSG-RAN WG4 Meeting #86bis Melbourne, Australia, Agenda Item 7.9.4.1.1, Aug. 16-20, 2018, 3 pages.

* cited by examiner

METHODS AND APPARATUS FOR SCHEDULING AVAILABILITY/RESTRICTION AND MEASUREMENT SHARING FOR SSB BASED INTER-FREQUENCY MEASUREMENT WITHOUT MEASUREMENT GAP

TECHNICAL FIELD

This application relates generally to wireless communication systems, and more specifically to synchronization signal block (SSB) based measurement.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the WEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANS use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Scheduling Availability/Restriction

Figure 1:
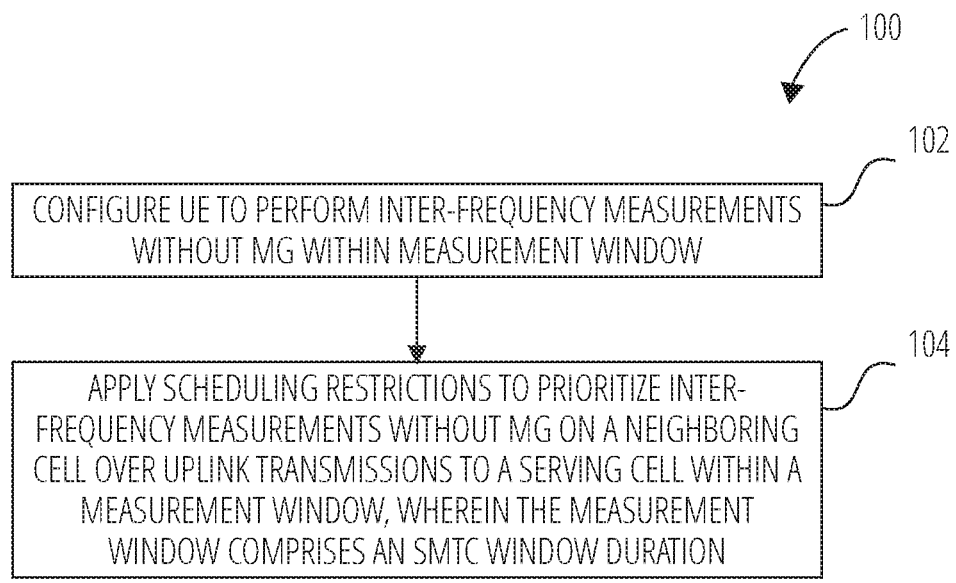
FIG. 1 illustrates a method in accordance with one embodiment.

In certain communication systems (e.g., Rel-16 NR), a new type of measurement has been introduced, namely, SSB based inter-frequency measurement without measurement gap (MG), the definition for this measurement is: a UE can perform SSB-based inter-frequency measurements without measurement gaps if the target SSB is completely contained in the active BWP of the UE.

With this inter-frequency measurement without MG, the scheduling restriction or availability may be newly designed if the inter-frequency SSB has different SCS from the data or control channel SCS in the UE active BWP in Frequency Range 1 or a first frequency range (FR1) or Frequency Range 2 or a second frequency range (FR2), or if the Rx beam sweeping is performed based on inter-frequency SSB in FR2.

For example, the current scheduling availability requirement in 3GPP TS 38.133 is as below.

In FR1, for a UE that does not support simultaneousRx-DataSSB-DiffNumerology (i.e., the UE supports concurrent intra-frequency measurement on a serving cell or neighboring cell and PDCCH or PDSCH reception from the serving cell with a different numerology), the following restrictions may apply due to synchronization signal (SS) reference signal receive power (SS-RSRP), SS received quality (SS-RSRQ), and/or SS signal-to-noise and interference ratio (SS-SINR) measurement. If deriveSSB_IndexFromCell is enabled, the UE is not expected to transmit a physical uplink control channel (PUCCH), a physical uplink shared channel (PUSCH), and or a sounding reference signal (SRS) or receive a physical downlink control channel (PDCCH), a physical downlink shared channel (PDSCH), a tracking reference signal (TRS), and/or a channel state information reference signal (CSI-RS) for a channel quality indicator (CQI) on SSB symbols to be measured, and on one data symbol before each consecutive SSB symbols to be measured and one data symbol after each consecutive SSB symbols to be measured within SMTC window duration. If the high layer in 3GPP TS 38.331 signaling of smtc2 is configured, the SMTC periodicity follows smtc2; otherwise SMTC periodicity follows smtc1. If deriveSSB_IndexFromCell is not enabled the UE is not expected to transmit PUCCH/PUSCH/SRS or receive PDCCH/PDSCH/TRS/CSI-RS for CQI on all symbols within SMTC window duration. If the high layer in 3GPP TS 38.331 signaling of smtc2 is configured, the SMTC periodicity follows smtc2; otherwise SMTC periodicity follows smtc1.

In FR2, the UE is not expected to transmit PUCCH/PUSCH/SRS or receive PDCCH/PDSCH/TRS/CSI-RS for CQI on SSB symbols to be measured, and on one data symbol before each consecutive SSB symbols to be measured and one data symbol after each consecutive SSB symbols to be measured within SMTC window duration (i.e., in certain implementations the signaling deriveSSB_IndexFromCell is always enabled for FR2). If the high layer in 3GPP TS 38.331 signaling of smtc2 is configured, the SMTC periodicity follows smtc2; otherwise SMTC periodicity follows smtc1.

However, the above UE/Network mechanism cannot be applied for inter-frequency measurement without MG case since the deriveSSB_IndexFromCell cannot help UE to derive the timing between serving cell and target cell and also an inter-frequency measurement object only can have one SMTC configuration. For intra-frequency and inter-frequency measurements, a measurement object indicates the frequency/time location and subcarrier spacing of reference signals to be measured. Associated with this measurement object, the network may configure a list of cell specific offsets Measurement Sharing/Restriction In certain communication systems (e.g., Rel-15 NR), inter-frequency measurement objects (MO) are associated with a MG, and therefore if intra-frequency measurement SSB collides with an inter-frequency measurement SSB in the MG, the network can configure the UE to follow the MG sharing mechanism to share the MG resource between intra-frequency MOs and inter-frequency MOs, which is duplicated as below as an example (in 3GPP TS 38.133). An MO may include a list of objects on which the UE performs measurements.

For NR standalone UE without NR-DC operation and configured with per-UE measurement gap, measurement gap sharing applies when the UE requires measurement gaps to identify and measure cells on intra-frequency carriers or when SMTC configured for intra-frequency measurement are fully overlapping with per-UE measurement gaps, and when the UE is configured to identify and measure cells on inter-frequency carriers, and/or inter-RAT E-UTRAN carriers.

When the network signals "01", "10" or "11" with RRC parameter MeasGapSharingScheme and the value of X is defined as in Table 9.1.2.1a-1 (3GPP TS 38.133), and Kintra=1/X*100, Kinter=1/(100−X)*100, when network signals "00" indicating equal splitting gap sharing, X is not applied.

The RRC parameter MeasGapSharingScheme may be applied to the calculation of carrier specific scaling factor as specified in clause 9.1.5.2.2 of 3GPP TS 38.133.

However, if the inter-frequency MOs are not associated with MG and they are colliding with intra-frequency measurement MOs without MG, the measurement resource sharing/restriction may need to be specified for clear UE behaviors, such as when: SSB based Inter-frequency MOs without MG fully overlapped with SSB based Intra-frequency MOs without MG; SSB based Inter-frequency MOs without MG partially overlapped with SSB based Intra-frequency MOs without MG; SSB based inter-frequency MOs without MG fully overlapped with SSB based Intra-frequency MOs with MG; and/or SSB based inter-frequency MOs without MG partially overlapped with SSB based Intra-frequency MOs with MG.

Example Embodiments for New Scheduling Availability/Restriction

Certain embodiments herein provide for scheduling availability of UE performing inter-frequency measurements without MG in time division duplex (TDD) or frequency division duplex FDD) bands on FR1.

In one embodiment, when UE performs inter-frequency measurements without MG in a TDD band, the following restrictions apply due to SS-RSRP or SS-SINR measurement: the UE is not expected to transmit PUCCH/PUSCH/SRS on all symbols within SMTC window duration. In addition, or in other embodiments, when the UE performs inter-frequency measurements without MG in a TDD band, the following restrictions apply due to SS-RSRQ measurement: the UE is not expected to transmit PUCCH/PUSCH/SRS on all symbols within SMTC window duration. In one embodiment, when TDD intra-band carrier aggregation is performed, the scheduling restrictions due to a given serving cell should also apply to all other serving cells in the same band on the symbols that fully or partially overlap with aforementioned restricted symbols.

Certain embodiments herein provide for scheduling availability of UE performing inter-frequency measurements without MG with a different subcarrier spacing than PDSCH/PDCCH on FR1. In one embodiment, for UE which do not support simultaneousRxDataSSB-DiffNumerology the following restrictions apply due to SS-RSRP/RSRQ/SINR measurement: the UE is not expected to transmit PUCCH/PUSCH/SRS or receive PDCCH/PDSCH/TRS/CSI-RS for CQI on all symbols within SMTC window duration. In one embodiment, when intra-band carrier aggregation is performed, the scheduling restrictions due to a given serving cell should also apply to all other serving cells in the same band on the symbols that fully or partially overlap with aforementioned restricted symbols.

Certain embodiments provide for scheduling availability of UE performing inter-frequency measurements without MG on FR2. In one embodiment, the following scheduling restriction applies due to SS-RSRP or SS-SINR measurement on an FR2 inter-frequency cell: the UE is not expected to transmit PUCCH/PUSCH/SRS or receive PDCCH/PDSCH/TRS/CSI-RS for CQI on all symbols within SMTC window duration. In addition, or in other embodiments, the following scheduling restriction applies to SS-RSRQ measurement on an FR2 inter-frequency cell: the UE is not expected to transmit PUCCH/PUSCH/SRS or receive PDCCH/PDSCH/TRS/CSI-RS for CQI on all symbols within SMTC window duration. In one embodiment, when intra-band carrier aggregation is performed, the scheduling restrictions due to a given serving cell should also apply to all other serving cells in the same band on the symbols that fully or partially overlap with aforementioned restricted symbols.

Example Embodiments for Measurement Sharing/Restriction

Certain embodiments provide for SSB based Inter-frequency MOs without MG fully overlapped with SSB based Intra-frequency MOs without MG in FR1 or FR2 and those SSBs have different numerologies. In one embodiment, if UE doesn't support simultaneousRxDataSSB-DiffNumerology, new sharing factor PL3_SSB_measurement would be used to indicate the measurement resource used for SSB based Inter-frequency MOs without MG and SSB based Intra-frequency MOs without MG. This PL3_SSB_measurement may be indicated from network or may be a specified constant. For example, PL3_SSB_measurement=3 for inter-frequency MOs without MG means the measurement period of inter-frequency MOs without MG will be scaled by 3, i.e., UE will use 1 measurement occasion out of 3 for inter-frequency MOs without MG. In addition, or in other embodiments, if UE supports simultaneousRxDataSSB-DiffNumerology, no measurement sharing or restriction would be applied to UE.

Certain embodiments provide for SSB based Inter-frequency MOs without MG partially overlapped with SSB based. Intra-frequency MOs without MG in FR1 or FR2 and those SSBs have different numerologies. In one embodiment, if UE doesn't support simultaneousRxDataSSB-DiffNumerology, UE will perform Inter-frequency measurement without MG on SMTC occasion of inter-frequency MO which are not colliding with the SMTC occasion for intra-frequency MOs. For example, scaling factor for inter-frequency measurement delay or measurement time without MG is $$P = \frac{1}{1 - \frac{T_{smtcPeriod\_inter-frequency}}{T_{smtcPeriod\_intra-frequency}}}$$

if T_(smtcPeriod_inter-frequency)<T_(smtcPeriod_intra-frequency);
wherein T_(smtcPeriod_inter-frequency) is the SMTC periodicity for inter-frequency MO without MG and T_(smtcPeriod_intra-frequency) is the SMTC periodicity for intra-frequency MO without MG (it might be smtc1 or smtc2 based on network configuration).

Certain embodiments provide for SSB based inter-frequency MOs without MG fully overlapped with MG occasions. In one embodiment, network will indicate the MG sharing factor to UE, and UE will use the MG sharing factor to decide on which MG time occasions UE can perform inter-frequency MOs without MGs. In addition, or in another embodiment, when network signals "01", "10" or "11" with RRC parameter MeasGapSharingScheme and the value of X is the MG sharing factor (e.g., 25%, 50% or 75%), and the measurement delay scaling factor can be:

Kintra=1/X*100(for all intra-frequency measurement),

Kinter=1/(100−X)*100(for all inter-frequency measurement)

Certain embodiments provide for SSB based inter-frequency MOs without MG-partially overlapped with MG occasions. In one embodiment, UE will perform SSB based inter-frequency MOs without MG always outside the MG occasions. In addition, or in another embodiment, outside the MG occasions, if SSB based inter-frequency MOs without MG fully overlapped with SSB based intra-frequency MOs with MG, UE will perform SSB based inter-frequency MOs without MG only. In certain embodiments, outside the MG occasions, if SSB based inter-frequency MOs without MG partially overlapped with SSB based intra-frequency MOs with MG, UE will perform SSB based inter-frequency MOs without MG only.

EXAMPLES

Example 1 may include an apparatus comprising means to perform one or more elements of a method described herein.

Example 2 may include one or more non-transitory computer-readable media comprising instructions to cause an electronic device, upon execution of the instructions by one or more processors of the electronic device, to perform one or more elements of a method described in any other method or process described herein.

Example 3 may include an apparatus comprising logic, modules, or circuitry to perform one or more elements of a method described in or related to any other method or process described herein.

Example 4 may include a method, technique, or process as described in or related to any of examples 1-3, or portions or parts thereof.

Example 5 may include an apparatus comprising: one or more processors and one or more computer-readable media comprising instructions that, when executed by the one or more processors, cause the one or more processors to perform the method, techniques, or process as described in or related to any embodiments herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

FIG. 1 is a flowchart of a method 100 for a UE to perform SSB based inter-frequency measurements. In block 102, the method 100 configures the UE to perform inter-frequency measurements without measurement gap (MG) within a measurement window. In block 104, the method 100 applies scheduling restrictions to prioritize the inter-frequency measurements over uplink transmissions within the measurement window, wherein the measurement window comprises an SSB measurement timing configuration (SMTC) window duration.

Figure 2:
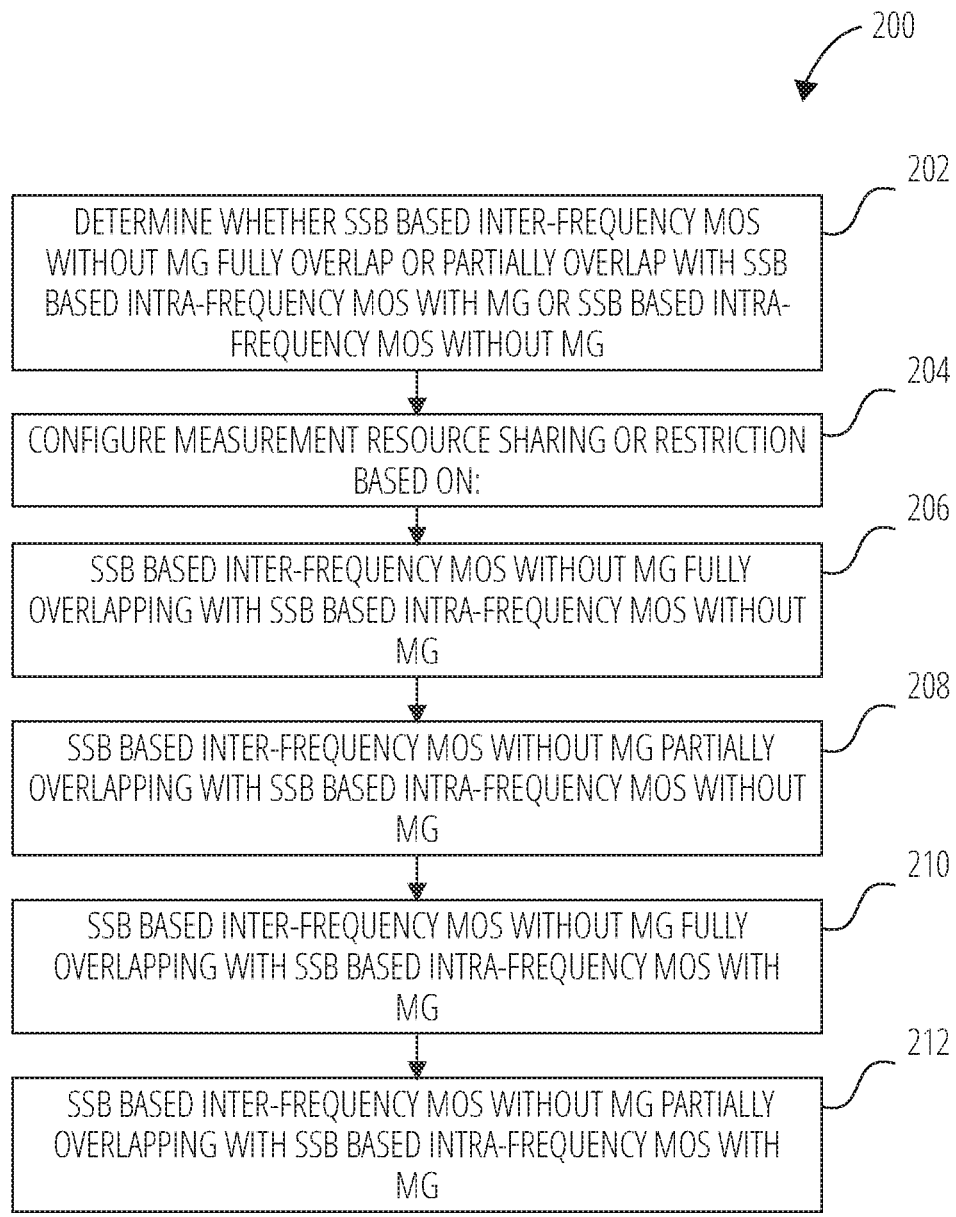
FIG. 2 illustrates a method in accordance with one embodiment.

FIG. 2 is a flowchart of a method 200 for a UE to perform measurement resource sharing or restriction for SSB based inter-frequency measurement objects (MOs) without measurement gap (MG). In block 202, the method 200 determines whether the SSB based inter-frequency MOs without MG fully overlap or partially overlap with SSB based intra-frequency MOs with MG or SSB based intra-frequency MOs without MG. In block 204, the method 200 configures the measurement resource sharing or restriction based on one or more of block 206, block 208, block 210, or block 212. In block 206, the method 200 configures the measurement resource sharing or restriction based on the SSB based inter-frequency MOs without MG fully overlapping with the SSB based intra-frequency MOs without MG. In block 208, the method 200 configures the measurement resource sharing or restriction based on the SSB based inter-frequency MOs without MG partially overlapping with the SSB based intra-frequency MOs without MG. In block 210, the method 200 configures the measurement resource sharing or restriction based on the SSB based inter-frequency MOs without MG fully overlapping with the SSB based intra-frequency MOs with MG. In block 212, the method 200 configures the measurement resource sharing or restriction based on the SSB based inter-frequency MOs without MG partially overlapping with the SSB based intra-frequency MOs with MG.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited. PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 3:
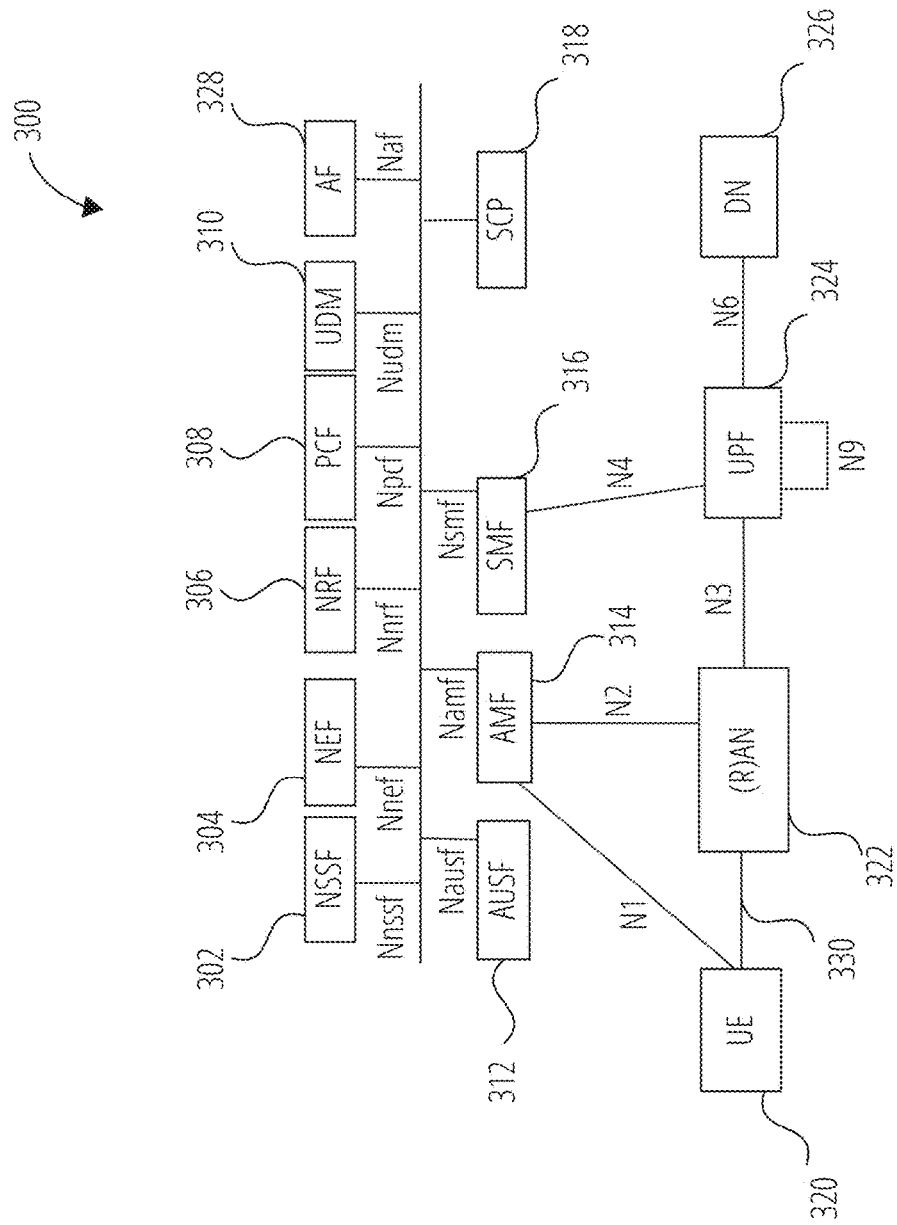
FIG. 3 illustrates an example service based architecture in accordance with certain embodiments.

FIG. 3 illustrates a service based architecture 300 in 5GS according to one embodiment. As described in 3GPP TS 23.501, the service based architecture 300 comprises NFs such as an NSSF 302, a NEF 304, an NRF 306, a PCF 308, a UDM 310, an AUSF 312, an AMF 314, an SMF 316, for communication with a UE 320, a (R)AN 322, a UPF 324, and a DN 326. The NFs and NF services can communicate directly, referred to as Direct Communication, or indirectly via a SCP 318, referred to as Indirect Communication. FIG. 3 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 3 are described below.

The NSSF 302 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 304 supports exposure of capabilities and events. NF capabilities and events may be securely exposed by the NEF 304 (e.g., for 3rd party, Application Functions, and/or Edge Computing). The NEF 304 may store/retrieve information as structured data using a standardized interface (Nudr) to a UDR. The NEF 304 may also secure provision of information from an external application to 3GPP network and may provide for the Application Functions to securely provide information to the 3GPP network (e.g., expected UE behavior, 5GLAN group information, and service specific information), wherein the NEF 304 may authenticate and authorize and assist in throttling the Application Functions. The NEF 304 may provide translation of internal-external information by translating between information exchanged with the AF and information exchanged with the internal network function. For example, the NEF 304 translates between an AF-Service-Identifier and internal 5G Core information such as DNN and S-NSSAI. The NEF 304 may handle masking of network and user sensitive information to external AF's according to the network policy. The NEF 304 may receive information from other network functions (based on exposed capabilities of other network functions), and stores the received information as structured data using a standardized interface to a UDR. The stored information can be accessed and re-exposed by the NEF 304 to other network functions and Application Functions, and used for other purposes such as analytics. For external exposure of services related to specific UE(s), the NEF 304 may reside in the HPLMN. Depending on operator agreements, the NEF 304 in the HPLMN may have interface(s) with NF(s) in the VPLMN. When a UE is capable of switching between EPC and 5GC, an SCEF+NEF may be used for service exposure.

The NRF 306 supports service discovery function by receiving an NF Discovery Request from an NF instance or SCP and providing the information of the discovered NF instances to the NF instance or SCP. The NRF 306 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 308 supports a unified policy framework to govern network behavior. The PCF 308 provides policy rules to Control Plane function(s) to enforce them. The PCF 308 accesses subscription information relevant for policy decisions in a Unified Data Repository (UDR). The PCF 308 may access the UDR located in the same PLMN as the PCF.

The UDM 310 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 310 uses subscription data (including authentication data) that may be stored in a UDR, in which case a UDM implements the application logic and may not require an internal user data storage and several different UDMs may serve the same user in different transactions. The UDM 310 may be located in the HPLMN of the subscribers it serves, and may access the information of the UDR located in the same PLMN.

The AF 328 interacts with the Core Network to provide services that, for example, support the following: application influence on traffic routing; accessing the NEF 304; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 304 to interact with relevant Network Functions.

The AUSF 312 supports authentication for 3GPP access and untrusted non-3GPP access. The AUSF 312 may also provide support for Network Slice-Specific Authentication and Authorization.

The AMF 314 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 314. Regardless of the number of Network functions, in certain embodiments there is only one NAS interface instance per access network between the UE and the CN, terminated at one of the Network functions that implements at least NAS security and Mobility Management. The AMF 314 may also include policy related functionalities.

In addition to the functionalities described above, the AMF 314 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 316 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session. Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 316 may include policy related functionalities.

The SCP 318 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group M/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 318 may be deployed in a distributed manner and/or more than one SCP can be present in the communication path between NF Services. SCPs can be deployed at PLAIN level, shared-slice level, and slice-specific level. It may be left to operator deployment to ensure that SCPs can communicate with relevant NRFs.

The UE 320 may include a device with radio communication capabilities. For example, the UE 320 may comprise a smartphone (e.g., handheld touchscreen mobile computing devices connectable to one or more cellular networks). The UE 320 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 320 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M. or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 320 may be configured to connect or communicatively couple with the (R)AN 322 through a radio interface 330, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 320 and the (R)AN 322 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 322 to the UE 320 and a UL transmission may be from the UE 320 to the (R)AN 322. The UE 320 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSCCH), and a Physical Sidelink Broadcast Channel (PSCCH).

The (R)AN 322 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 322 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 322) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 320 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source serving (R)AN node to new (target) serving (R)AN node.

The UPF 324 may act as an anchor point for intra-RAT and inter-RAT mobility, an external PDU session point of interconnect to the DN 326, and a branching point to support multi-homed PDU session. The UPF 324 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 324 may include an uplink classifier to support routing traffic flows to a data network. The DN 326 may represent various network operator services, Internet access, or third party services. The DN 326 may include, for example, an application server.

Figure 4:
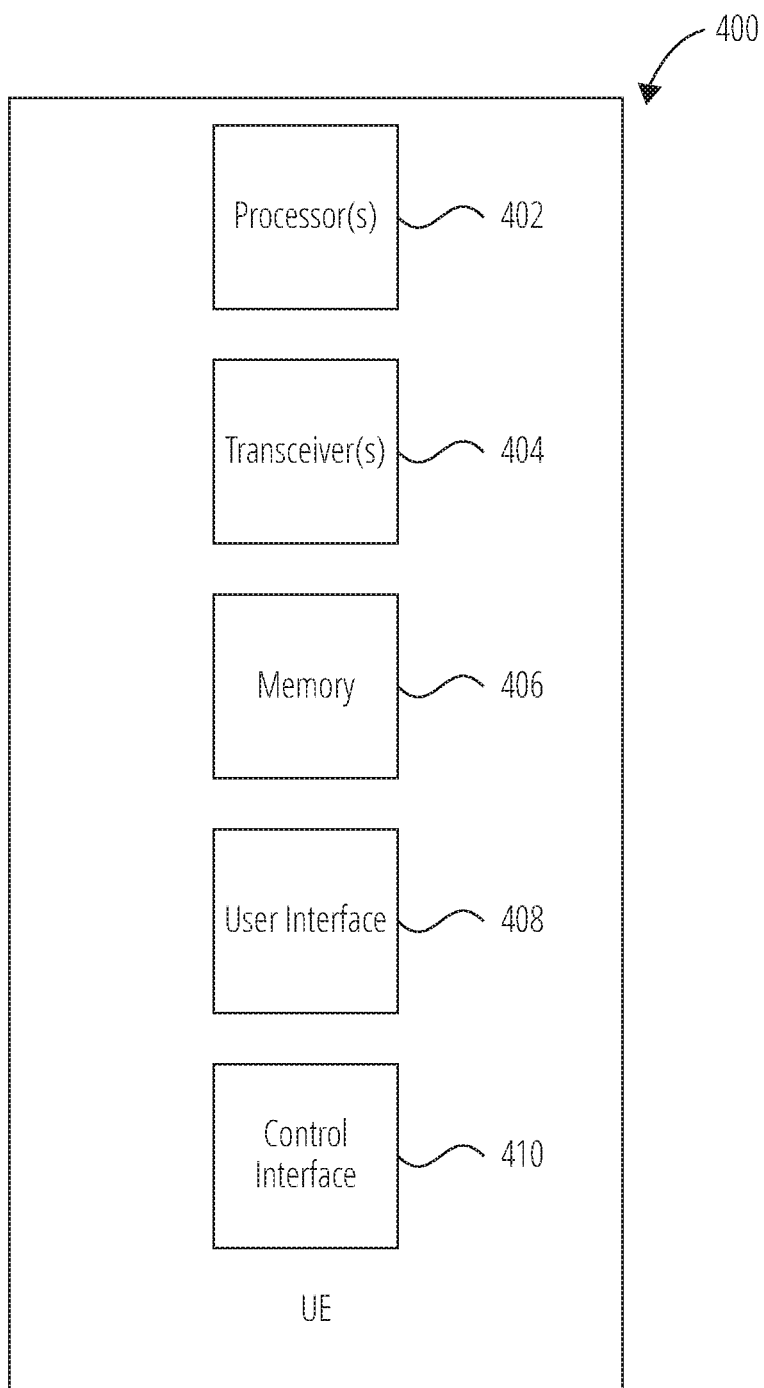
FIG. 4 illustrates a UE in accordance with one embodiment.

FIG. 4 is a block diagram of an example UE 400 configurable according to various embodiments of the present disclosure, including by execution of instructions on a computer-readable medium that correspond to any of the example methods and/or procedures described herein. The UE 400 comprises one or more processor 402, transceiver 404, memory 406, user interface 408, and control interface 410.

The one or more processor 402 may include, for example, an application processor, an audio digital signal processor, a central processing unit, and/or one or more baseband processors. Each of the one or more processor 402 may include internal memory and/or may include interface(s) to communication with external memory (including the memory 406). The internal or external memory can store software code, programs, and/or instructions for execution by the one or more processor 402 to configure and/or facilitate the UE 400 to perform various operations, including operations described herein. For example, execution of the instructions can configure the UE 400 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 404, user interface 408, and/or control interface 410. As another example, the one or more processor 402 may execute program code stored in the memory 406 or other memory that corresponds to MAC, RLC, PDCP, and RRC layer protocols standardized by 3GPP (e.g., for NR and/or LTE). As a further example, the processor 402 may execute program code stored in the memory 406 or other memory that, together with the one or more transceiver 404, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 406 may comprise memory area for the one or more processor 402 to store variables used in protocols, configuration, control, and other functions of the UE 400, including operations corresponding to, or comprising, any of the example methods and/or procedures described herein. Moreover, the memory 406 may comprise non-volatile memory (e.g., flash memory), volatile memory (e.g., static or dynamic RAM), or a combination thereof. Furthermore, the memory 406 may interface with a memory slot by which removable memory cards in one or more formats (e.g., SD Card, Memory Stick, Compact Flash, etc.) can be inserted and removed.

The one or more transceiver 404 may include radio-frequency transmitter and/or receiver circuitry that facilitates the UE 400 to communicate with other equipment supporting like wireless communication standards and/or protocols. For example, the one or more transceiver 404 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 402. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 404 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 402 to implement a PHY layer based on OFDM, OFDMA, and/or SC-FDMA technologies, such as described herein with respect to other figures.

The user interface 408 may take various forms depending on particular embodiments, or can be absent from the UE 400. In some embodiments, the user interface 408 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 400 may comprise a tablet computing device including a larger touchscreen display. In such embodiments, one or more of the mechanical features of the user interface 408 may be replaced by comparable or functionally equivalent virtual user interface features (e.g., virtual keypad, virtual buttons, etc.) implemented using the touchscreen display, as familiar to persons of ordinary skill in the art. In other embodiments, the UE 400 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 400 having a touch screen display are capable of receiving user inputs, such as inputs related to exemplary methods and/or procedures described herein or otherwise known to persons of ordinary skill in the art.

In some exemplary embodiments of the present disclosure, the UE 400 may include an orientation sensor, which can be used in various ways by features and functions of the UE 400. For example, the UE 400 can use outputs of the orientation sensor to determine when a user has changed the physical orientation of the UE 400's touch screen display. An indication signal from the orientation sensor can be available to any application program executing on the UE 400, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 410 may take various forms depending on particular embodiments. For example, the control interface 410 may include an RS-232 interface, an RS-485 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1260 can comprise an IEEE 802.3 Ethernet interface such as described above. In some embodiments of the present disclosure, the control interface 410 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 400 may include more functionality than is shown in FIG. 4 including, for example, a video and/or still-image camera, microphone, media player and/or recorder, etc. Moreover, the one or more transceiver 404 may include circuitry for communication using additional radio-frequency communication standards including Bluetooth, GPS, and/or others. Moreover, the one or more processor 402 may execute software code stored in the memory 406 to control such additional functionality. For example, directional velocity and/or position estimates output from a GPS receiver can be available to any application program executing on the UE 400, including various exemplary methods and/or computer-readable media according to various exemplary embodiments of the present disclosure.

Figure 5:
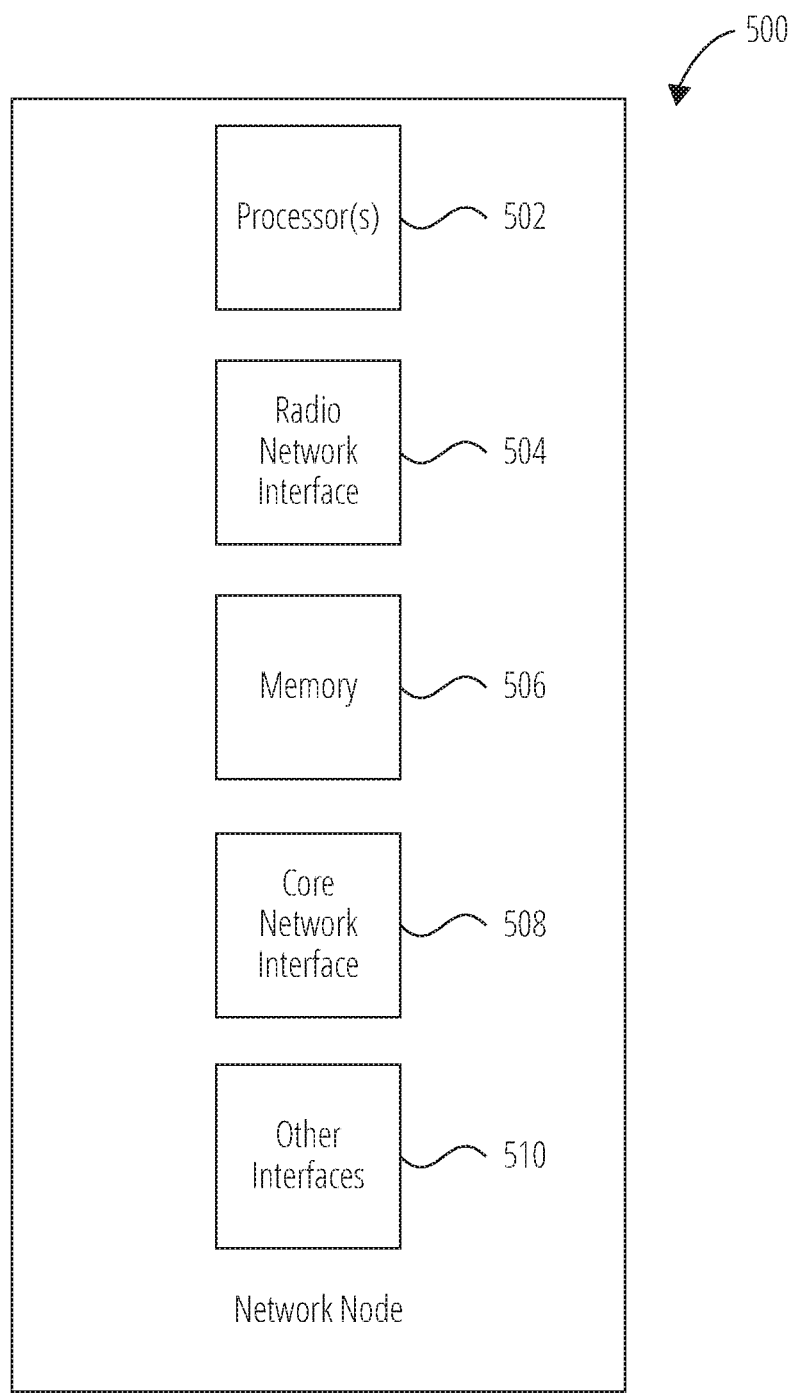
FIG. 5 illustrates a network node in accordance with one embodiment.

FIG. 5 is a block diagram of an example network node 500 configurable according to various embodiments of the present disclosure, including by execution of instructions on a computer-readable medium that correspond to any of the example methods and/or procedures described herein.

The network node 500 includes a one or more processor 502, a radio network interface 504, a memory 506, a core network interface 508, and other interfaces 510. The network node 500 may comprise, for example, a base station, eNB, gNB, access node, or component thereof.

The one or more processor 502 may include any type of processor or processing circuitry and may be configured to perform an of the methods or procedures disclosed herein. The memory 506 may store software code, programs, and/or instructions executed by the one or more processor 502 to configure the network node 500 to perform various operations, including operations described herein. For example, execution of such stored instructions can configure the network node 500 to communicate with one or more other devices using protocols according to various embodiments of the present disclosure, including one or more methods and/or procedures discussed above. Furthermore, execution of such stored instructions can also configure and/or facilitate the network node 500 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 504 and the core network interface 508. By way of example and without limitation, the core network interface 508 comprise an S1 interface and the radio network interface 504 may comprise a Uu interface, as standardized by 3GPP. The memory 506 may also store variables used in protocols, configuration, control, and other functions of the network node 500. As such, the memory 506 may comprise non-volatile memory (e.g., flash memory, hard disk, etc.), volatile memory (e.g., static or dynamic RAM), network-based (e.g., "cloud") storage, or a combination thereof.

The radio network interface 504 may include transmitters, receivers, signal processors, ASICs, antennas, beamforming units, and other circuitry that enables network node 500 to communicate with other equipment such as, in some embodiments, a plurality of compatible user equipment (UE). In some embodiments, the network node 500 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 504 may include a PITY layer based on OFDM, OFDMA, and/or SC-TDMA technologies. In some embodiments, the functionality of such a PHY layer can be provided cooperatively by the radio network interface 504 and the one or more processor 502.

The core network interface 508 may include transmitters, receivers, and other circuitry that enables the network node 500 to communicate with other equipment in a core network such as, in some embodiments, circuit-switched (CS) and/or packet-switched Core (PS) networks. In some embodiments, the core network interface 508 may include the S1 interface standardized by 3GPP. In some embodiments, the core network interface 508 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 508 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 510 may include transmitters, receivers, and other circuitry that enables the network node 500 to communicate with external networks, computers, databases, and the like for purposes of operations, administration, and maintenance of the network node 500 or other network equipment operably connected thereto.

EXAMPLES

For one or more embodiments, at least one of the components set forth in one or more of the preceding figures may be configured to perform one or more operations, techniques, processes, and/or methods as set forth in the examples below. For example, baseband circuitry or other processors or processing circuitry as described herein may be configured to operate in accordance with one or more of the examples set forth below. For another example, circuitry associated with a UE, base station, network element, etc. as described above in connection with one or more of the preceding figures may be configured to operate in accordance with one or more of the examples set forth in the examples below.

Example 1 may include an apparatus comprising means to perform one or more elements of a method described herein.

Example 2 may include one or more non-transitory computer-readable media comprising instructions to cause an electronic device, upon execution of the instructions by one or more processors of the electronic device, to perform one or more elements of a method or process described herein.

Example 3 may include an apparatus comprising logic, modules, or circuitry to perform one or more elements of a method or process described herein.

Example 4 may include a method, technique, or process as described in or related to any of examples 1-3, or portions or parts thereof.

Example 5 may include an apparatus comprising: one or more processors and one or more computer-readable media comprising instructions that, when executed by the one or more processors, cause the one or more processors to perform the method, techniques, or process as described in or related to any embodiments herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a user equipment (UE) to perform synchronization signal block (SSB) based inter-frequency measurements, the method comprising:
   configuring the UE to perform inter-frequency measurements without measurement gap (MG) within a measurement window in a time division duplex (TDD) band in a first frequency range (FR1);
   applying scheduling restrictions to prioritize the inter-frequency measurements without MG on a neighboring cell over uplink transmissions to a serving cell within the measurement window, wherein the measurement window comprises an SSB measurement timing configuration (SMTC) window duration; and
   applying a scheduling restriction due to a synchronization signal (SS) reference signal receive power (SS-RSRP) measurement, an SS reference signal received quality (SS-RSRQ) measurement, or an SS signal-to-noise and interference ratio (SS-SINR) measurement by the UE, wherein the UE is restricted from transmitting a physical uplink control channel (PUCCH), a physical uplink shared channel (PUSCH), or a sounding reference signal (SRS) on restricted symbols comprising all symbols within the SMTC window duration.

2. The method of claim 1, further comprising, when performing TDD intra-band carrier aggregation, applying the scheduling restrictions corresponding to a particular serving cell to other serving cells in a same band on one or more symbols that fully or partially overlap with the restricted symbols.

3. The method of claim 1, further comprising configuring the UE to perform the inter-frequency measurements without MG using either TDD or frequency division duplex (FDD) with a different subcarrier spacing (SCS) than that of a physical downlink shared channel (PDSCH) or a physical downlink control channel (PDCCH) in the FR1.

4. The method of claim 3, wherein the UE does not support concurrent intra-frequency measurement on the serving cell or neighboring cell and the PDCCH or the PDSCH reception from the serving cell with different numerologies, the method further comprising:
   applying a scheduling restriction due to the SS-RSRP measurement, the SS-RSRQ measurement, or the SS-SINR measurement by the UE,
   wherein the UE is restricted from transmitting the PUCCH, the PUSCH, or the SRS on the restricted symbols comprising all the symbols within the SMTC window duration, and
   wherein the UE is restricted from receiving the PDCCH, the PDSCH, a tracking reference signal (TRS), or a channel state information reference signal (CSI-RS) for a channel quality indicator (CQI) on the restricted symbols.

5. The method of claim 4, further comprising, when performing intra-band carrier aggregation, applying the scheduling restrictions corresponding to a particular serving cell to other serving cells in a same band on one or more symbols that fully or partially overlap with the restricted symbols.

6. The method of claim 4, further comprising generating UE capability information for communication to a cellular network to indicate that the UE does not support simultaneousRxDataSSB-DiffNumerology.

7. The method of claim 1, further comprising:
   configuring the UE to perform the inter-frequency measurements without MG on a second frequency range (FR2);
   applying a scheduling restriction due to the SS-RSRP measurement, the SS-RSRQ measurement, or the SS-SINR measurement by the UE,
   wherein the UE is restricted from transmitting the PUCCH, the PUSCH, or the SRS on the restricted symbols comprising all the symbols within the SMTC window duration, and
   wherein the UE is restricted from receiving a physical downlink control channel (PDCCH) a physical downlink shared channel (PDSCH), a tracking reference signal (TRS), or a channel state information reference signal (CSI-RS) for a channel quality indicator (CQI) on the restricted symbols.

8. The method of claim 7, further comprising, when performing intra-band carrier aggregation, applying the scheduling restrictions corresponding to a particular serving cell to other serving cells in a same band on one or more symbols that fully or partially overlap with the restricted symbols.

9. A method for a user equipment (UE) to perform measurement resource sharing or restriction for synchronization signal block (SSB) based inter-frequency measurement objects (MOs) without measurement gap (MG), the method comprising:
   determining one of the following four conditions is met:
      the SSB based inter-frequency MOs without MG fully overlapping with the SSB based intra-frequency MOs without MG;
      the SSB based inter-frequency MOs without MG partially overlapping with the SSB based intra-frequency MOs without MG;
      the SSB based inter-frequency MOs without MG fully overlapping with the SSB based intra-frequency MOs with MG; or
      the SSB based inter-frequency MOs without MG partially overlapping with the SSB based intra-frequency MOs with MG; and
   based on determining that the SSB based inter-frequency MOs without MG partially overlaps with the SSB based intra-frequency MOs with MG, configuring the measurement resource sharing or restriction.

10. The method of claim 9, further comprising, when the SSB based inter-frequency MOs without MG partially overlaps with the SSB based intra-frequency MOs with MG, performing the SSB based inter-frequency MOs without MG outside of MG occasions.

11. The method of claim 10, wherein outside the MG occasions, if the SSB based inter-frequency MOs without MG fully overlap with the SSB based intra-frequency MOs with MG, performing the SSB based inter-frequency MOs without MG only.

* * * * *